United States Patent Office 3,297,692
Patented Jan. 10, 1967

3,297,692
7-ALKYLMERCAPTOACETAMIDOCEPHALO-SPORANIC ACID
Edwin H. Flynn, Indianapolis, Ind., assignor to Eli Lilly and Company, Indianapolis, Ind., a corporation of Indiana
No Drawing. Filed Dec. 27, 1965, Ser. No. 516,760
5 Claims. (Cl. 260—243)

This application is a continuation-in-part of my application Serial No. 99,998, filed April 3, 1961, now abandoned.

This invention relates to novel antibiotic substances and to methods for their preparation and use.

The novel compounds of the present invention are improved 7-mercaptoacetamido derivatives of cephalosporanic acid, having the following formula:

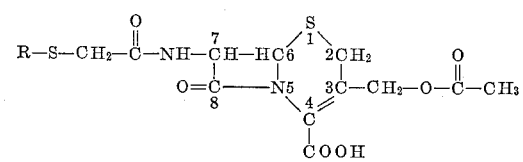

and the salts thereof with pharmaceutically acceptable cations, in which

R is $C_4$–$C_6$ n-alkyl or $C_4$–$C_6$ isoalkyl.

Thus, R. can be n-butyl, isobutyl, n-amyl, isoamyl, n-hexyl, or isohexyl.

The compounds of the present invention are highly effective antibacterial agents, being orally absorbed and lower in median effective dose against hemolytic streptococci than the 7-mercaptoacetamido cephalosporins of the prior art. They are characterized by penicillinase-resistance, acid stability, and activity against a broad range of microorganisms, including both Gram-positive and a number of the Gram-negative pathogens. They are conveniently prepared and administered in the form of the salts of the carboxyl group with pharmaceutically acceptable cations, including, for example, water-soluble salts such as the sodium, potassium, lithium, ammonium, and substituted ammonium salts, as well as the less water-soluble salts such as the calcium, barium, procaine, quinine, and dibenzylethylenediamine salts. Administration is preferably by intramuscular injection in isotonic saline at a dose (for adults) around 0.25 to 0.50 g. every four to six hours. Oral administration generally requires a somewhat higher dosage, from 0.50 to 1.0 g. every four to six hours, and can be carried out in the form of pressed tablets, filled gelatin capsules or suspensions of conventional type or the like.

The following examples will illustrate the compounds available in accordance with the present invention:

7-isobutylmercaptoacetamidocephalosporanic acid
7-n-amylmercaptoacetamidocephalosporanic acid
7-n-hexylmercaptoacetamidocephalosporanic acid
7-isohexylmercaptoacetamidocephalosporanic acid.

The source material for the compounds of the present invention is cephalosporin C, more precisely known as 7-(5'-aminoadipamido)cephalosporanic acid, which can be prepared by cultivating a cephalosporin C-producing organism in a suitable nutrient medium, as described in British patent specification 810,196, published March 11, 1959.

Cephalosporin C is readily converted into the corresponding nucleus compound, 7-aminocephalosporanic acid, by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al. described in U.S. Pat. 3,188,311 (June 8, 1965).

The nucleus thus obtained is conveniently converted into a 7-acylamidocephalosporanic acid as desired by acylation. For this purpose, any of the conventional acylation procedures can be employed, utilizing any of the various types of known acylating agents having the composition which yields the desired side chain. A convenient acylating agent is the appropriate acyl chloride or bromide. The acylation is carried out in water or an appropriate organic solvent, preferably under substantially neutral conditions, and preferably at reduced temperature, i.e., above the freezing point of the reaction mixture and up to about 20° C. In a typical procedure, 7-aminocephalosporanic acid is dissolved in water with a sufficient quantity of sodium bicarbonate or other appropriate alkali to promote solution, the concentration of the 7-aminocaphalosporanic acid being about 1 to about 4 percent by weight. The solution is cooled to around 0 to 5° C., and a solution of the acylating agent is added in about 20 percent excess, with stirring and cooling. The pH of the mixture can be maintained, if it tends to vary, around the neutral level by bubbling carbon dioxide therein. After addition of the acylating agent has been completed, stirring of the reaction mixture is continued and the mixture is allowed to warm to room temperature. The reaction product is then acidified to around pH 2 and extracted with an organic solvent such as ethyl acetate. The ethyl acetate extract is back-extracted with water at pH 5.5 to 6, employing for pH adjustment a base containing the cation of the desired final product. The water solution is separated and evaporated substantially to dryness. The residue is taken up in a minimum quantity of water and the acylation product is precipitated by adding a large excess of acetone, and if necessary, ether. The crystalline product obtained thereby is filtered, washed with acetone, and dried.

The acylation can also be carried out with the corresponding carboxylic acid, employed in conjunction with an equimolar proportion of a carbodiimide such as N,N'-diisopropylcarbodiimide, N,N'-dicyclohexylcarbodiimide, N,N'-bis(p-dimethylaminophenyl)carbodiimide, N-ethyl-N'-(4''-ethylmorpholinyl)carbodiimide, or the like, and the acylation proceeds at ordinary temperatures in such cases. Alternatively, the carboxylic acid can be converted into the corresponding acid anhydride, or into the azide, or into an activated ester, and any of these derivatives can be used to effect the desired acylation. Other agents can readily be ascertained from the art.

The acylating agents required in the preparation of the compounds of the present invention are readily obtained by methods well known in the art.

The invention will be more readily understood from the following operating examples, which are submitted as illustrations only, and not by way of limitation.

*Example 1*

7-aminocephalosporanic acid (1.0 g.) and sodium bicarbonate (680) mg.) were dissolved in approximately 50 percent aqueous acetone. The solution was cooled in an ice bath, and n-butylmercaptoacetyl chloride (613 mg., dissolved in a minimum quantity of acetone) was added with stirring over a period of 45 minutes, after which the stirring was continued for 2.5 hours while the mixture warmed to room temperature. The acetone was then stripped out at ordinary temperature, employing a rotating flask evaporator at reduced pressure. The resulting aqueous solution was acidified to pH 2.0 with concentrated hydrochloric acid and extracted with ethyl acetate. The ethyl acetate phase was separated, adjusted to pH 5.5 with 0.5 N aqueous potassium hydroxide solution, and extracted with water. The aqueous extract was separated and evaporated to dryness at room temperature and reduced pressure. The residue was dissolved in the minimum quantity of water and diluted with a large excess of acetone. The resulting crystalline precipitate was filtered off, washed with acetone, and again dissolved and precipitated, after which it was dried.

The product was the potassium salt of 7-n-butylmercaptoacetamidocephalosporanic acid, weighing 1.13 grams, having a maximum in its ultraviolet absorption spectrum at 263 m$\mu$ ($\epsilon$=7800), and having an X-ray powder diffraction pattern as follows, obtained with nickel-filtered copper radiation of 1.5405 A.U. wavelength and a Debye-Scherrer camera:

| $d$: | $I/I_1$ |
|---|---|
| 16.82 | 1.00 |
| 13.90 | .15 |
| 9.98 | .05 |
| 8.79 | .10 |
| 7.55 | .15 |
| 5.69 | .15 |
| 5.02 | .05 |
| 4.69$b$ | .50 |
| 4.29 | .25 |
| 4.18 | .37 |
| 3.98 | .37 |
| 3.77 | .37 |
| 3.43$b$ | .25 |
| 3.23 | .05 |
| 2.92 | .10 |
| 2.81 | .03 |
| 2.70 | .05 |
| 2.37 | .10 |
| 2.22 | .05 |

$b$ indicates broad line

It had a median effective dose ($ED_{50}$) against hemolytic streptococci in mice of 20.6 mg./kg. ×2.

*Example 2*

7-isoamylmercaptoacetamidocephalosphoranic acid was prepared as the potassium salt by reacting 7-aminocephalosporanic acid (1.0 g.), sodium bicarbonate (680 mg.), and isoamylmercaptoacetyl chloride (660 mg.) according to the procedure and under the conditions of Example 1. The product weighed 980 mg. and had a maximum at 263 m$\mu$ ($\epsilon$=7650) in its ultraviolet absorption spectrum. It had a median effective dose ($ED_{50}$) against hemolytic streptococci in mice of 24.8 mg./kg. ×2.

While the invention has been illustrated by reference to certain specific embodiments thereof, it will be understood that various modifications will be readily apparent to those skilled in the art, and such modifications are to be considered as lying within the scope of the invention.

I claim:

1. An antibiotic substance having the formula:

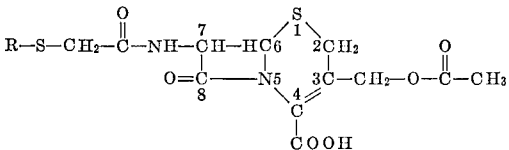

wherein R is $C_4$-$C_6$ n-alkyl or $C_4$-$C_6$ isoalkyl; and the salts thereof with pharmaceutically acceptable cations.

2. An antibiotic substance as in claim 1, said antibiotic substance being 7-n-butylmercaptoacetamidocephalosporanic acid.

3. An antibiotic substance as in claim 1, said antibiotic substance being 7-isoamylmercaptoacetamidocephalosporanic acid.

4. An antibiotic substance as in claim 1, said antibiotic substance being 7-isobutylmercaptoacetamidocephalosphoranic acid.

5. An antibiotic substance as in claim 1, said antibiotic substance being 7-n-amylmercaptoacetamidocephalosporanic acid.

References Cited by the Examiner

UNITED STATES PATENTS

| 3,079,306 | 2/1963 | Offo et al. | 260—239.1 |
| 3,173,916 | 3/1965 | Shull et al. | 260—243 |
| 3,207,755 | 9/1965 | Abraham et al. | 260—243 |

ALEX MAZEL, *Primary Examiner.*

JAMES W. ADAMS, JR., *Assistant Examiner.*